(12) United States Patent
Kuenemund et al.

(10) Patent No.: US 10,607,033 B2
(45) Date of Patent: Mar. 31, 2020

(54) PHYSICAL UNCLONEABLE FUNCTION CIRCUIT

(71) Applicant: Infineon Technologies AG, Neubiberg (DE)

(72) Inventors: Thomas Kuenemund, Munich (DE); Berndt Gammel, Markt-Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 121 days.

(21) Appl. No.: 15/883,120

(22) Filed: Jan. 30, 2018

(65) Prior Publication Data

US 2018/0218177 A1 Aug. 2, 2018

(30) Foreign Application Priority Data

Feb. 2, 2017 (DE) .................. 10 2017 102 037

(51) Int. Cl.
*G06F 21/75* (2013.01)
*G06F 21/73* (2013.01)
(Continued)

(52) U.S. Cl.
CPC .............. *G06F 21/75* (2013.01); *G06F 21/72* (2013.01); *G06F 21/73* (2013.01); *G09C 1/00* (2013.01);
(Continued)

(58) Field of Classification Search
CPC .......... G06F 21/75; G06F 21/73; G06F 21/72; G09C 1/00; H04L 9/0866; H04L 9/3278; H04L 9/0861; G11C 7/24; G11C 7/1006; G11C 11/419; G11C 11/412; H03K 19/00315
See application file for complete search history.

(56) References Cited

U.S. PATENT DOCUMENTS 7,916,517 B2 3/2011 Kuenemund
7,969,763 B2 6/2011 Kunemund
(Continued)

OTHER PUBLICATIONS

Heiko Lohrke et al., "No Place to Hide: Contactless Probing of Secret Data on FPGAs", Cryptographic Hardware and Embedded Systems—CHES 2016, 2016, vol. 9813, Springer, Heidelberg.
(Continued)

*Primary Examiner* — Mohammed Waliullah
(74) *Attorney, Agent, or Firm* — Viering, Jentschura & Partner mbB

(57) ABSTRACT

According to one embodiment, a physical uncloneable function circuit for providing a protected output bit is described including at least one physical uncloneable function circuit element configured to output a bit of a physical uncloneable function value, a physical uncloneable function bit output terminal and a coupling circuit connected between the physical uncloneable function circuit element and the physical uncloneable function bit output terminal configured to receive a control signal, supply the bit to the physical uncloneable function bit output terminal for a first state of the control signal and supply the complement of the bit to the physical uncloneable function bit output terminal for a second state of the control signal.

15 Claims, 8 Drawing Sheets

(51) Int. Cl.

| | |
|---|---|
| *G06F 21/72* | (2013.01) |
| *H04L 9/32* | (2006.01) |
| *G11C 7/10* | (2006.01) |
| *G11C 7/24* | (2006.01) |
| *H04L 9/08* | (2006.01) |
| *G09C 1/00* | (2006.01) |
| *G11C 11/412* | (2006.01) |
| *G11C 11/419* | (2006.01) |
| *H03K 19/003* | (2006.01) |

(52) U.S. Cl.
CPC ............ *G11C 7/1006* (2013.01); *G11C 7/24* (2013.01); *G11C 11/412* (2013.01); *G11C 11/419* (2013.01); *H03K 19/00315* (2013.01); *H04L 9/0861* (2013.01); *H04L 9/0866* (2013.01); *H04L 9/3278* (2013.01)

(56) References Cited

U.S. PATENT DOCUMENTS

| | | | |
|---|---|---|---|
| 9,276,583 | B1 | 3/2016 | Satpathy et al. |
| 9,762,400 | B2* | 9/2017 | Mathew ................ H04L 9/3278 |
| 2015/0171870 | A1* | 6/2015 | Parker .............. H03K 19/17768 380/44 |
| 2017/0017808 | A1 | 1/2017 | Kwong et al. |
| 2017/0272258 | A1* | 9/2017 | Tanamoto ............. H04L 9/0866 |

OTHER PUBLICATIONS

C. Boit et al., "Contactless Visible Light Probing for Nanoscale ICs through 10 μm Bulk Silicon", Proceedings of the 35th Annual NANO Testing Symposium—NANOTS, 2015, pp. 215-221, Institute of NANO Testing, Osaka.

Martin Von Hartmann et al., "Optical Fault Isolation and Nanoprobing Techniques for the 10nm Technology Node and Beyond", 41st International Symposium for Testing and Failure Analysis, Nov. 2015, pp. 47-51, ASM International, USA.

Shahin Tajik et al., "Photonic Side Channel Analysis of Arbiter PUFs", Journal of Cryptoöogy, Apr. 2017, pp. 550-571, vol. 30.

Jeyavijayan Rajendran et al., "Security Analysis of Integrated Circuit Camouflaging", Proceedings of the 2013 ACM SIGSAC conference on Computer & communications security, Nov. 2013, pp. 709-720, ACM, Berlin.

Clemens Helfmeier et al., "Physical Vulnerabilities of Physically Unclonable Functions", Design, Automation and Test in Europe Conference and Exhibition (DATE), 2014, 4 pages.

Siva Kolachina, "Introduction to Laser Voltage Probing (LVP) of Integrated Circuits", Microelectronics Failure Analysis Desk Reference, Oct. 2011, pp. 426-430, 6th edition.

"Dynamic Random Access Memory". In Wikipedia. Retrieved Jan. 29, 2018, from https://en.wikipedia.org/wiki/Dynamic_random-access_memory.

* cited by examiner

PHYSICAL UNCLONEABLE FUNCTION CIRCUIT

CROSS-REFERENCE TO RELATED APPLICATION

This application claims priority to German Patent Application Serial No. 10 2017 102 037.3, which was filed Feb. 2, 2017, and is incorporated herein by reference in its entirety.

TECHNICAL FIELD

The present disclosure relates to physical uncloneable function circuits.

BACKGROUND

Integrated circuits which are used in security-related applications, such as chip cards used for authorization of a user, are a potential target for attacks which have the purpose to extract secret information such as encryption keys. One group of attacks is based on methods originally devised for failure analysis methods which may be used to extract secret data from an integrated circuit. Approaches to prevent such attacks are desirable.

SUMMARY

According to one embodiment, a physical uncloneable function circuit for providing a protected output bit is provided comprising at least one physical uncloneable function circuit element configured to output a bit of a physical uncloneable function value, a physical uncloneable function bit output terminal and a coupling circuit connected between the circuit element and the physical uncloneable function bit output terminal configured to receive a control signal, supply the bit to the physical uncloneable function bit output terminal for a first state of the control signal and supply the complement of the bit to the physical uncloneable function bit output terminal for a second state of the control signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
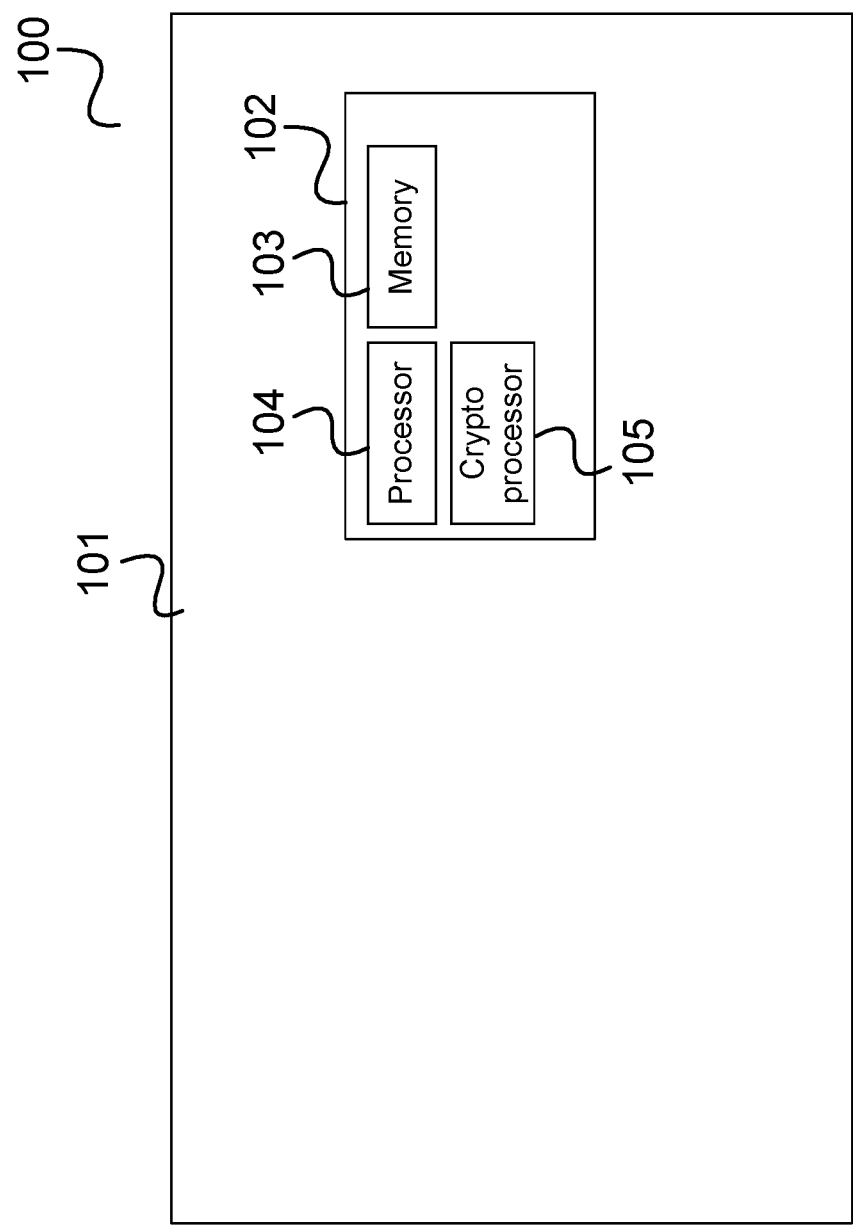
FIG. 1 shows a chip card according to an embodiment.

It is desirable for a large variety of chips to be protected against attacks, in particular for chips used in security-related contexts such as on a chip card as illustrated in FIG. 1.

FIG. 1 shows a chip card 100 according to an embodiment.

The chip card 100 includes a carrier 101 on which a chip card module 102 is arranged. The chip card module 102 includes various data processing components like for example a memory 103, e.g. an SRAM (Static Random Access Memory), a processor 104 or for example a dedicated crypto processor 105. The chip card may be used in a security-related context, e.g. for payment, authorization, etc. Accordingly, the chip card module 102 may store secret data and should be protected against attacks.

It particular, a failure analysis method may be deployed for attacking a Security IC such as the chip card module 102, e.g. in order to extract secret data (e.g. an encryption key) from the IC by means of semi-invasive optical contactless probing like PEM (Photon Emission Analysis) and in particular LVx, i.e. LVP (LASER Voltage Probing) as well as LVI (LASER Voltage Imaging). LVx herein stands for LVP or LVI.

A security IC may also use a PUF which may be subject to an attack. PUF stands for "Physically Uncloneable Function", or physical hash function. The idea in this case is to digitize physical characteristics of an object and thus obtain a bit sequence (number) assigned to the object. It is desirable in this case for the bit sequences of two different physical objects to be uncorrelated with one another. A simple illustrative example is a sheet of paper. Examination under a microscope reveals a specific fine structure of the wood chips or pulp parts. The structure can be measured by means of a suitable method and the result can be represented as a bit sequence. This bit sequence is the PUF or PUF value for the sheet. With this procedure, a different sheet of paper generally produces a bit sequence that is uncorrelated to the bit sequence of the first sheet. The process for generating a bit sequence (the PUF value) from the characteristics of the physical object is referred to as PUF generation. One possibility for implementing a PUF in a security IC is PUF generation based on the initial state after power-up of a multiplicity of SRAM cells, e.g. of the memory 102, a part of the memory 102 or an additional component with a memory structure (i.e. comprising memory cells, e.g. SRAM cells, but for example only used for PUF generation rather than as actual memory), that depend on inevitable fabrication process variations of e.g. MOSFET threshold voltages and channel mobilities and may be for example used for key generation.

It has been shown that an SRAM-based Physical Uncloneable PUF may in fact be cloned once the SRAM PUF data have been extracted, i.e. of the bit values the SRAM cells assume after power up.

Thus, it is highly desirable to develop circuit concepts and techniques that thwart Contactless Probing of signal paths in Integrated Circuits, in particular for SRAM based PUFs and the case of LVx, since these methods (in contrast to PEM) may be scaled along with the shrinking features and supply voltages (VDD) of future DSM (Deep Sub-Micron) technologies, as the LVx signal level (i.e. the modulation of the reflected LASER beam) decreases linearly with VDD, whereas, as for PEM, hot-carrier effects that generate IR emissions depend exponentially on VDD.

Typical present security ICs may not exhibit dedicated counter measures against OCP (Optical Contactless Probing). However, data path (XOR-) masking of critical signals with e.g. random One-Time Pads (OTP), if properly implemented, is an effective protection since it renders the necessary (LVx) signal averaging while the IC under attack is running in a triggered loop to achieve reliable signal-to-noise ratios impossible.

However, for SRAM-based PUFs, a counter measure against OCP in this way is typically not possible: Since in the case of SRAM-based PUF circuitry the relevant data are plain, being the SRAM cells' data after power-up, and depending only on fabrication process variations, they cannot be masked as indicated above. This would only be possible if these data were explicitly and previously written to the SRAM (like for conventional SRAM operation): then, the data might even be masked outside the SRAM prior to writing them to the SRAM where the masked data are then stored, as well as the mask (which could also be stored elsewhere) in order to recover the plain data when needed.

The following counter measures (if applicable and feasible, respectively, in the cases under consideration) may be used to thwart Contactless Probing of an integrated circuit:

(1) Spatial and temporal randomisation of the IC's circuitry and the signal transitions, respectively. These are, however, not feasible in every situation: in custom macros like SRAMs spatial randomisation is of only limited value since it means only permutation of address and/or data latch positions. In addition to that this would incur the need to descramble the data outside the SRAM for further data processing resulting in high cost in terms of additional circuitry as well as longer and more energy consuming data paths. Temporal randomisations further entails additional circuitry as well as longer and more energy consuming data paths that may render this measure unaffordable. Similar statements hold for shrouding the relevant SRAM access within sequences of "dummy" accesses.

(2) Minimising the relevant geometric dimensions (feature sizes and distances) of the structures under attack (in case of LVx this are the diffusion regions of switching MOS FETs) to bedevil optical resolution, since LVx and similar approaches typically operate in the near infrared spectral range. In addition to that, this entails also minimising the node capacitances of critical nodes, which in turn means that LVx with photon energies above the silicon band-gap (i.e. wave-lengths below 1.1 µm) may not be applied because of photo-ionisation and the resulting charge transfer to the sensitive nodes causing circuit malfunction. Moreover, LVx with an e.g. 1064 nm LASER may be corrupted by means of integrated light sensors and/or "forbidden-state circuitry". For the case of data paths with complementary signal wiring and associated MOSFETs this means that the relevant complementary diffusion regions as well as the distances between them should be minimised in order to aggravate the absolute as well as the relative optical resolutions related to complementary MOSFETs.

(3) The above mentioned OTP-masking of critical signals, at least for particularly exposed signal nodes in e.g. custom macros featuring regular circuitry (bit slice) layout.

(4) Minimising the Critical Time Interval (CTI) during which attack targets (secret data) are physically visible, since LVx depends on signal transitions (rather than signal states), so that the amount of leaking information may be minimised if the CTIs are kept as small as possible compared to the duration of the LVx LASER pulses (down to some 10 ps).

(5) The above CTIs should not depend on the respective system clock frequencies. In other words, the CTI should be controlled by asynchronous state machines, in order to force the attacker to precisely control the LVx pulse sequence timings, since LVx pulses outside CTI do not yield information.

According to various embodiments, appropriate combinations of the above indicated counter measures, in particular (2)-(5), may be used in order to protect SRAM based PUF implementations against optical contactless probing, in particular against LVx. Since in the case of SRAM based PUF circuitry the relevant data are plain, being the SRAM cells' data after power-up, depending only on inevitable fabrication process variations, they cannot be masked as indicated in counter measure (3). This would only be possible if these data were explicitly written to the SRAM like for conventional SRAM operation, where the data may be masked outside the SRAM prior to writing them to the SRAM where the masked data are then stored, as well as the mask (which could also be stored elsewhere) in order to recover the plain data when needed.

In the following, embodiments are described for the protection of an SRAM-based PUF generation. An SRAM comprises a multiplicity of SRAM cells which are each connected to a word line and two complementary bit lines. Typically, a plurality of SRAM cells are connected to the same complementary bit lines, forming a so-called bit-slice of the SRAM.

Figure 2:
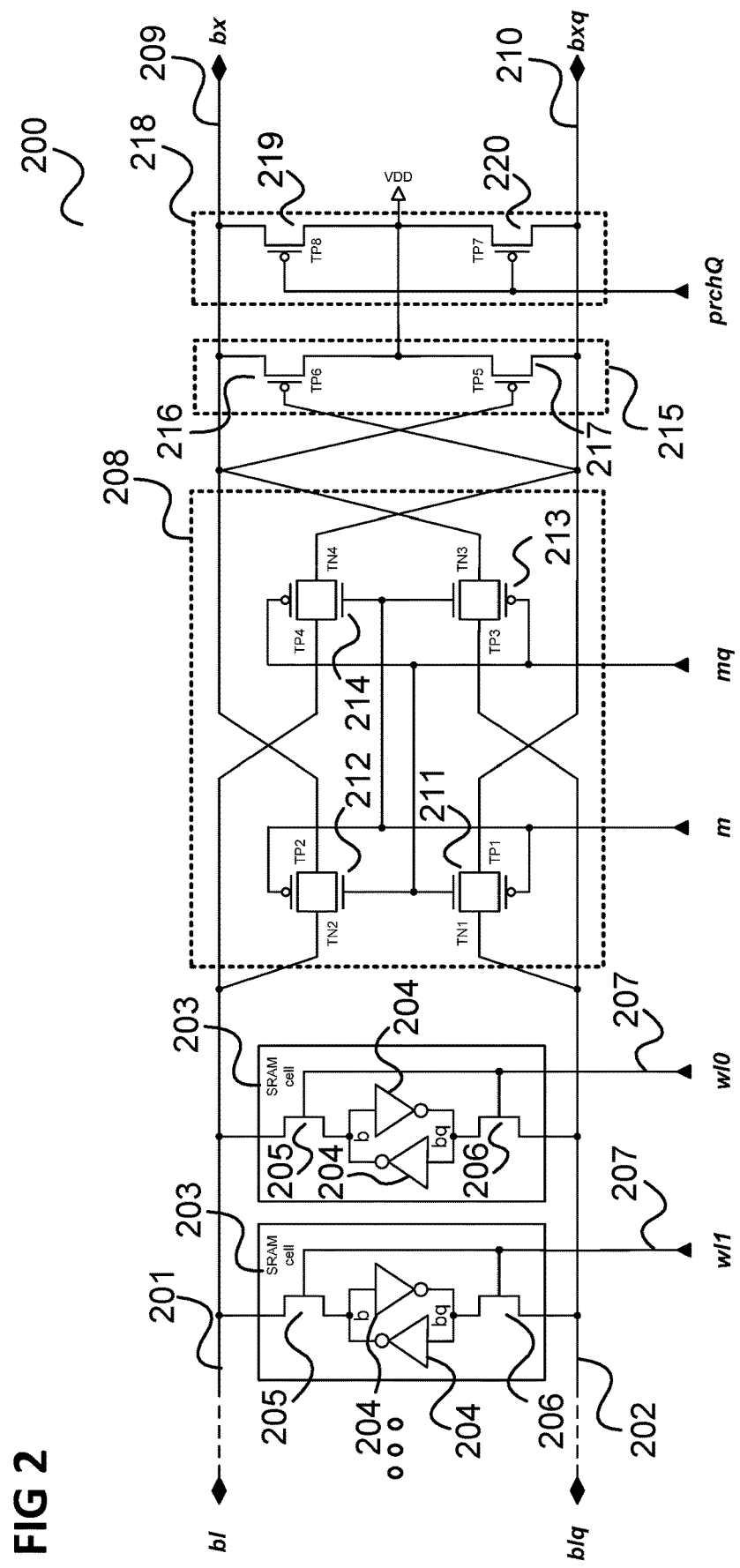
FIG. 2 shows an implementation of an SRAM bit-slice according to an embodiment.

FIG. 2 shows an implementation of an SRAM bit-slice 200 according to an embodiment.

The SRAM bit-slice 200 comprises a first bit line 201 and a second bit line 202 which is complementary to the first bit line 201, i.e. has the complementary logic value to the logic value of the first bit line 201. SRAM cells 203 are connected between the bit lines 201, 202, wherein each SRAM cell 203 has a pair of cross-coupled inverters 204 wherein one point of their coupling, denoted as b, is connected to the first bit-line 201 via a first n channel field effect transistor (FET) 205 and the other point of their coupling, denoted as bq (complementary to b), is connected to the second bit-line 202 via a second n channel field effect transistor 206. The gates of the first n channel FET 205 and the second n channel FET 206 are connected to a respective word line 207 (i.e. a word line associated with the respective SRAM cell 203).

The SRAM bit-slice 200 may comprise a multiplicity of SRAM cells 203 connected to the bit-lines 201, 202 in this way (and a corresponding multiplicity of word lines 207) and an SRAM memory, e.g. the memory 103, or an SRAM memory-like component for PUF generation may comprise a multiplicity of such bit-slices 200.

The SRAM bit-slice 200 further comprises a bit-line masking circuit 208.

The bit-line masking circuit 208 provides protection against OCP by means of conditional inversion of the meaning of the external (bit-slice) output of the first bit-line 201, referred to as bx (output via a first bit-line terminal 209), and its complement, i.e. the external (bit-slice) output of the second bit-line 202, referred to as bxq (output via a second bit-line terminal 210), respectively. This is achieved with a transmission-gate XOR circuit realising the XOR of the state of the first bit-line 201, referred to as bl (and its complement, i.e. the state of the second bit-line 202, blq), with a (random) mask m (and its complement mq) according to $$bx = bl \cdot mq + blq \cdot m$$

$$bxq = bl \cdot m + blq \cdot mq$$

Specifically, the bit-line masking circuit 208 comprises a first transmission gate 211 whose input is connected to the second bit-line 202, whose output is connected to the second bit-line terminal 210, whose p channel FET control input is supplied with the mask m and whose n channel FET control input is supplied with the mask's complement mq.

Further, the bit-line masking circuit 208 comprises a second transmission gate 212 whose input is connected to the first bit-line 201, whose output is connected to the first bit-line terminal 209, whose p channel FET control input is supplied with the mask m and whose n channel FET control input is supplied with the mask's complement mq.

Further, the bit-line masking circuit 208 comprises a third transmission gate 213 whose input is connected to the second bit-line 202, whose output is connected to the first bit-line terminal 209, whose n channel FET control input is supplied with the mask m and whose p channel FET control input is supplied with the mask's complement mq.

Further, the bit-line masking circuit 208 comprises a fourth transmission gate 214 whose input is connected to the first bit-line 201, whose output is connected to the second bit-line terminal 210, whose n channel FET control input is supplied with the mask m and whose p channel FET control input is supplied with the mask's complement mq.

The bit-slice 200 further comprises a bus keeper circuit 215 comprising a first p channel FET 216 connected with its source and drain between the first bit-line terminal 209 and a high supply terminal (VDD) and whose gate is connected to the second bit-line terminal 210 and comprising a second p channel FET 217 connected with its source and drain between the second bit-line terminal 210 and the high supply terminal (VDD) whose gate is connected to the first bit-line terminal 209.

The bit-slice 200 further comprises a precharge circuit 218 comprising a third p channel FET 219 connected with its source and drain between the first bit-line terminal 209 and the high supply terminal (VDD) whose gate is supplied with a precharge signal and comprising a fourth p channel FET 220 connected with its source and drain between the second bit-line terminal 210 and the high supply terminal (VDD) whose gate is supplied with a low-active precharge control signal.

In the bit-slice 200, all FET (e.g. MOSFET) diffusion regions connected to bx or bxq are protected by the (random) conditional inversion of bl and blq, since the averaged LVx outputs for bx and bxq do not differ.

On the other hand, all FET diffusion regions connected to bl or blq can, for this scenario, be assumed to be so small in terms of geometry and so sensitive to ionising radiation that LVx cannot optically resolve the critical diffusion regions.

To precharge the bit-lines (to VDD), a low-active precharge control signal prchQ is set to VSS, whereas the mask m and the mask's complement mq remain in their (previous) complementary state, i.e. mq=not(m), so that the first bit-line terminal 209 (bx) remains connected to the first bit line 201 (bl) or the second bit line 202 (blq), and the second bit-line terminal 210 (bxq) to the second bit line 202 (blq) or the first bit line 201 (bl).

Figure 3:
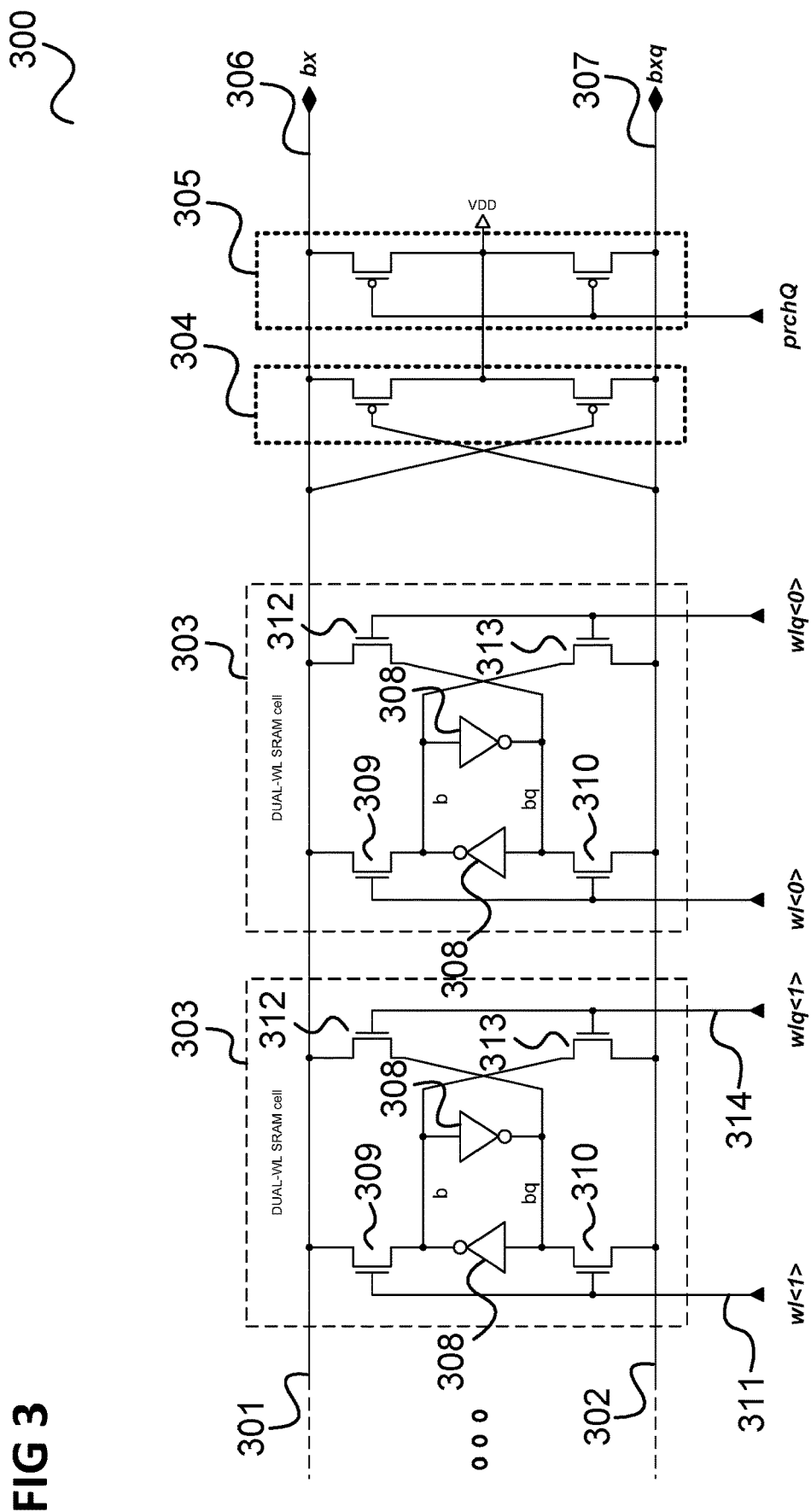
FIG. 3 shows an SRAM bit-slice according to an alternative embodiment, where the SRAM cells themselves incorporate a conditional inversion to protect against OCP (Optical Contactless Probing).

FIG. 3 shows an SRAM bit-slice 300 according to an alternative, where the SRAM cells themselves incorporate the conditional inversion to protect against OCP, for the case of very high optical LVx resolution.

Similarly to the bit-slice 200, the bit-slice 300 comprises a plurality of SRAM cells 303, a bus keeper circuit 304 and a precharge circuit 305, connected between a first bit-line 301 and a second bit-line 302, wherein the first bit-line 301 comprises a first bit-line terminal 306 and the second bit-line 302 comprises a second bit-line terminal 307.

In this example, each SRAM cell 303, similarly to the SRAM cells 203 of the SRAM bit-slice 200, comprises a pair of cross-coupled inverters 308 wherein one point of their coupling, denoted as b, is connected to the first bit-line 301 via a first n channel field effect transistor (FET) 309 and the other point of their coupling, denoted as bq (complementary to b), is connected to the second bit-line 302 via a second n channel FET 310. The gates of the first n channel FET 309 and the second n channel FET 310 are connected to a respective word line 311.

In addition, each SRAM cell 303 comprises a third n channel FET 312 connected between the first bit-line 301 and the point of coupling bq of the inverters 308 and a fourth n channel FET 313 connected between the second bit-line 302 and the point of coupling b of the inverters 308. The gates of the third n channel FET 312 and the fourth n channel FET 313 are connected to a respective complementary word line 314. This means that each SRAM cell 303 of the bit-slice 300 has an associated word line 311 and an associated complementary word line 314, wherein only one line of the set of word lines 311 and complementary word lines 314 is activated at a time for reading out an SRAM cell 303 of the SRAM bit-slice 300.

Here, if a word-line 311 is activated, i.e. set to VDD (whereas its complement 314 remains inactive, i.e. at the lower supply potential VSS), the first bit-line terminal 306 is connected to the point of coupling (cell node) b, and the second bit-line terminal bxq 307 to the point of coupling bq.

On the other hand, if a complementary word-line 314 is activated, i.e. set to VDD (whereas its associated word line 311, i.e. the word line associated with the same SRAM cell 303, remains inactive, i.e. at the lower supply potential VSS), the first bit-line terminal 306 is connected to the point of coupling (complementary cell node) bq, and the second bit-line terminal 307 is connected to the point of coupling b.

Figure 4:
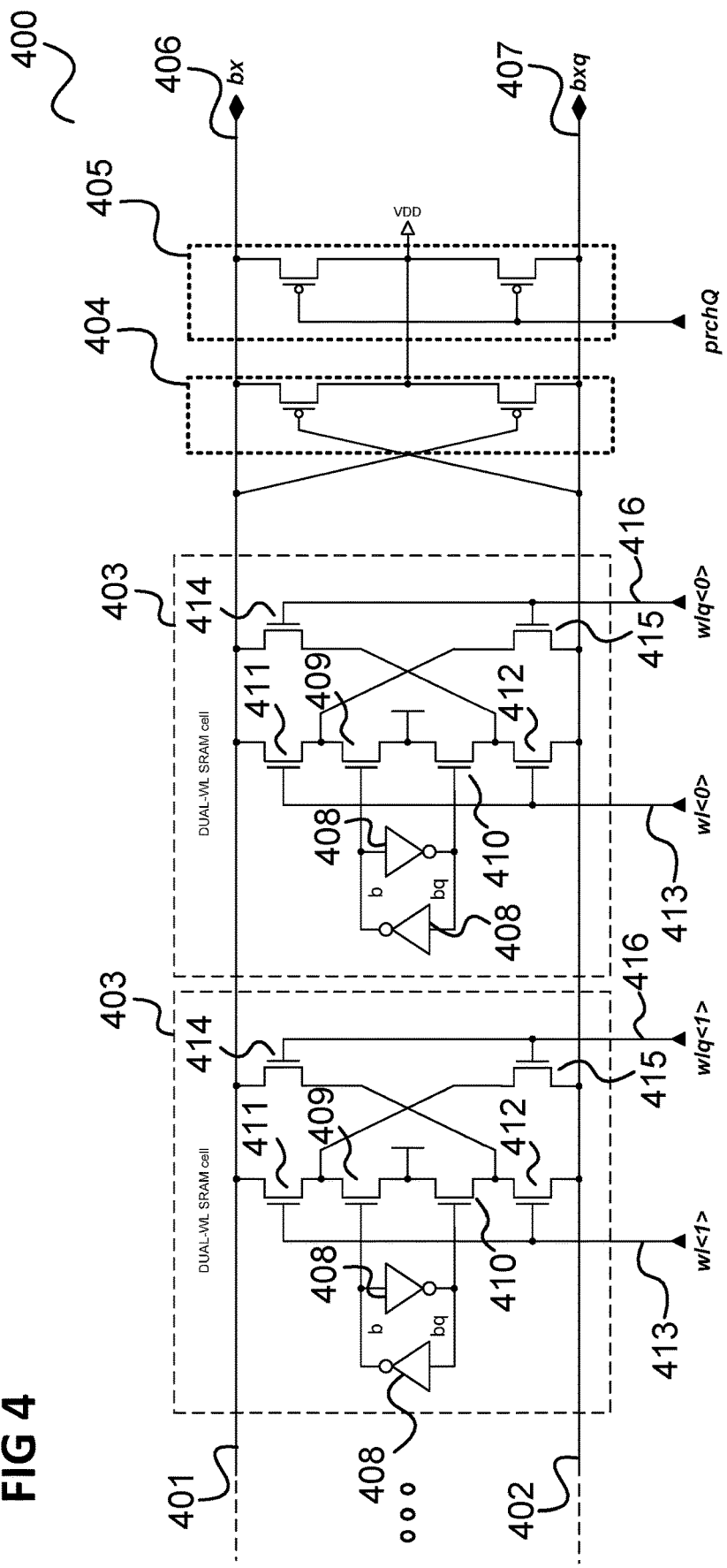
FIG. 4 shows an SRAM bit-slice according to an alternative embodiment, which is a read-only implementation that may be used for PUF implementations, where the memory cells themselves incorporate the conditional inversion to protect against OCP.

FIG. 4 shows an SRAM bit-slice 400 according to an alternative, which is a read-only implementation that may be used for PUF implementations, where the memory cells themselves incorporate the conditional inversion to protect against OCP, for the case of very high optical LVx resolution.

Similarly to the bit-slice 200, the bit-slice 400 comprises a plurality of SRAM cells 403, a bus keeper circuit 404 and a precharge circuit 405, connected between a first bit-line 401 and a second bit-line 402, wherein the first bit-line 401 comprises a first bit-line terminal 406 and the second bit-line 402 comprises a second bit-line terminal 407.

In this example, each SRAM cell 403, similarly to the SRAM cells 203 of the SRAM bit-slice 200, comprises a pair of cross-coupled inverters 408. However, in this example, one point of their coupling, denoted as b, is connected to the gate of a first n channel FET 409 and the other point of their coupling, denoted as bq (complementary to b), is connected to the gate of second n channel FET 410.

Each SRAM cell 403 further comprises a third n channel FET 411 connected with its source and drain between the first bit-line 401 and the first n channel FET 409, wherein the gate of the third n channel FET 411 is connected to the SRAM cell's associated word line 413 and the first n channel FET 409 is connected with its source and drain between the third n channel FET 411 and a low supply terminal (VSS).

Each SRAM cell 403 further comprises a fourth n channel FET 412 connected with its source and drain between the second bit-line 402 and the second n channel FET 410, wherein the gate of the fourth n channel FET 412 is connected to the SRAM cell's associated word line 413 and the second n channel FET 410 is connected with its source and drain between the fourth n channel FET 412 and the low supply terminal (VSS).

In addition, each SRAM cell 403 comprises a fifth n channel FET 414 connected between the first bit-line 401 and the point of coupling of the second n channel FET 410 with the fourth n channel FET 412 and a sixth n channel FET 415 connected between the second bit-line 402 and the point of coupling of the first n channel FET 409 with the third n channel FET 411. The gates of the fifth n channel FET 414 and the sixth n channel FET 415 are connected to a respective complementary word line 416.

Here, the cell-internal points of coupling (cell nodes) b and bq are not connected to diffusion regions of access devices at all, but to gates of n channel FETs 409, 410 (e.g. MOSFETs). In addition to that, and connected in series to the first n channel FET 409 and the second n channel FET 410, there are the third n channel FET 411 and the fourth n channel FET 412 as access devices whose gates are connected to the cell's word-line 413 (wl) or its complementary word-line 416 (wlq), so that if a word-line 413 is activated, i.e. set to VDD (whereas its complementary word line 416 remains inactive, i.e. at the lower supply potential VSS), the first bit-line terminal 406 (bx) assumes the inverted logical value of the point of coupling (cell node) b, and the second bit-line terminal (bxq) the inverted value of the point of coupling bq. If a complementary word-line 416 is activated, i.e. set to VDD (whereas the corresponding word line 413 remains inactive, i.e. at the lower supply potential VSS), the first bit-line terminal 416 (bx) assumes the inverted logical value of the point of coupling (complementary cell node) bq, and the second bit-line terminal 407 (bxq) the inverted value of the point of coupling b.

Figure 5:
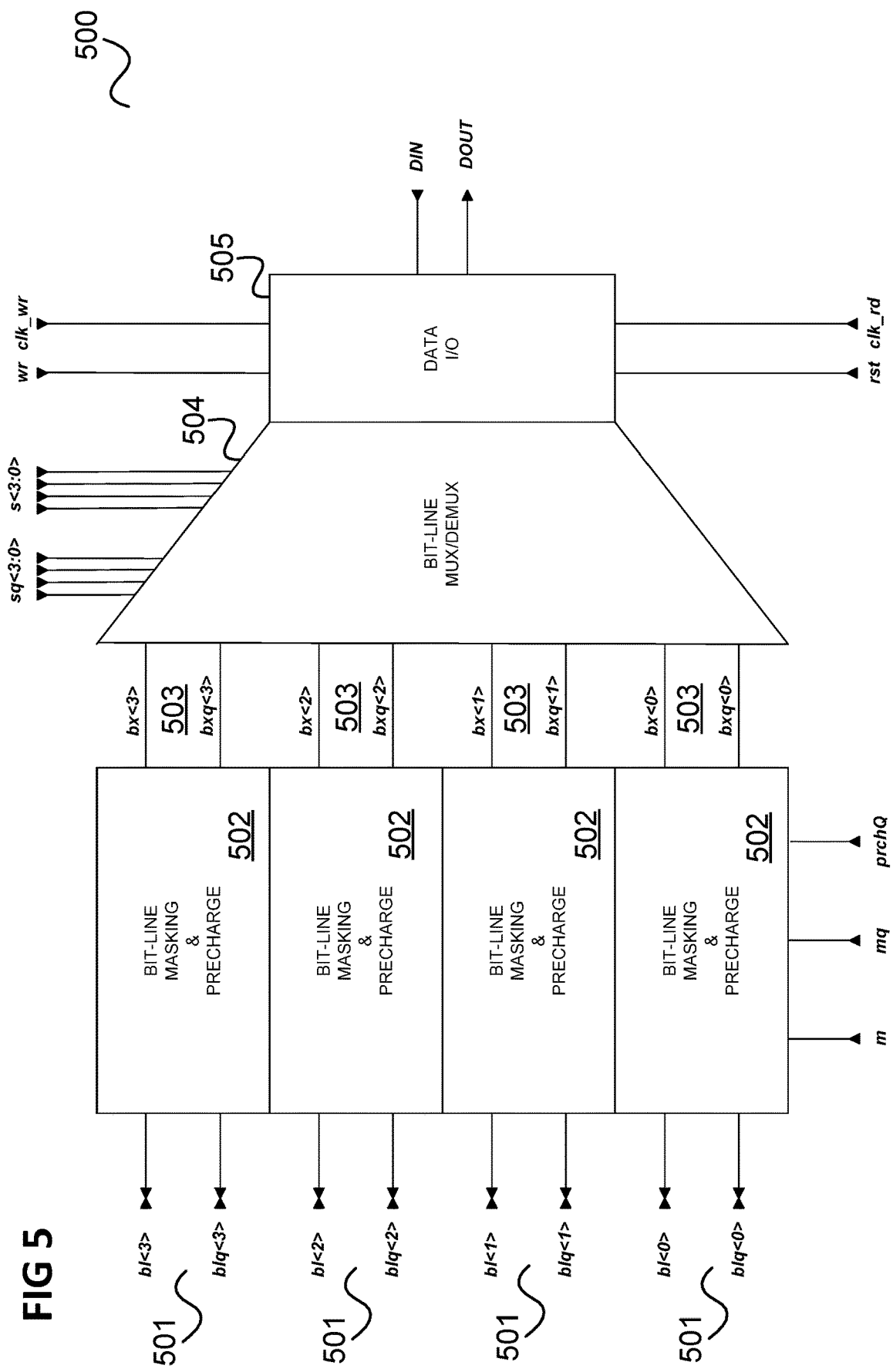
FIG. 5 shows a further example for a SRAM with protection against OCP.

FIG. 5 shows an example for a SRAM 500 with protection against optical contactless probing, in particular for a 4-bit bit-line sub-array including the bit-line masking and precharge circuitry as well as the bit-line (de)multiplexers and the data I/O circuitry.

The SRAM 500 comprises a plurality of pairs of bit lines 501 (e.g. four bit-line pairs (bl<j>, blq<j>), j=0 . . . 3), wherein each pair of bit lines 501 for example corresponds to the pair of bits lines 201, 202, 301, 302 or 401, 402 of one of the FIGS. 2 to 4.

Each pair of bit lines 501 is connected to a bit-line masking and precharge circuit 502 which may include a precharge circuit, a bus keeper and a bit-line masking circuit in a cell external implementation (like described with reference to FIG. 2) or a cell internal implementation (like described with reference to FIGS. 3 and 4).

The bit-line masking and precharge circuit 502 has respective pairs of bit line terminals 503 (as described with reference to FIGS. 2 to 4) and the bit line terminals 503 of all bit-line pairs 501 are fed to a bit line multiplexer/demultiplexer 504, i.e. a circuit which operates either as multiplexer or demultiplexer depending on whether a read access or a write access is processed. Specifically, the multiplexer/demultiplexer 504 multiplexes data bits read from one of the bit line pairs 501 to an input/output (I/O) circuit 505 or demultiplexes data bits to be written to one of the bit line pairs 501 provided by the input/output circuit 505 in accordance with a first select signal s (for the respective bit line) and a (complementary) second select signal sq (for the respective complementary bit line).

The input/output circuit 505 has a data input DIN (for receiving data to be written to the SRAM) and a data output DOUT (for outputting data read from the SRAM).

Figure 6:
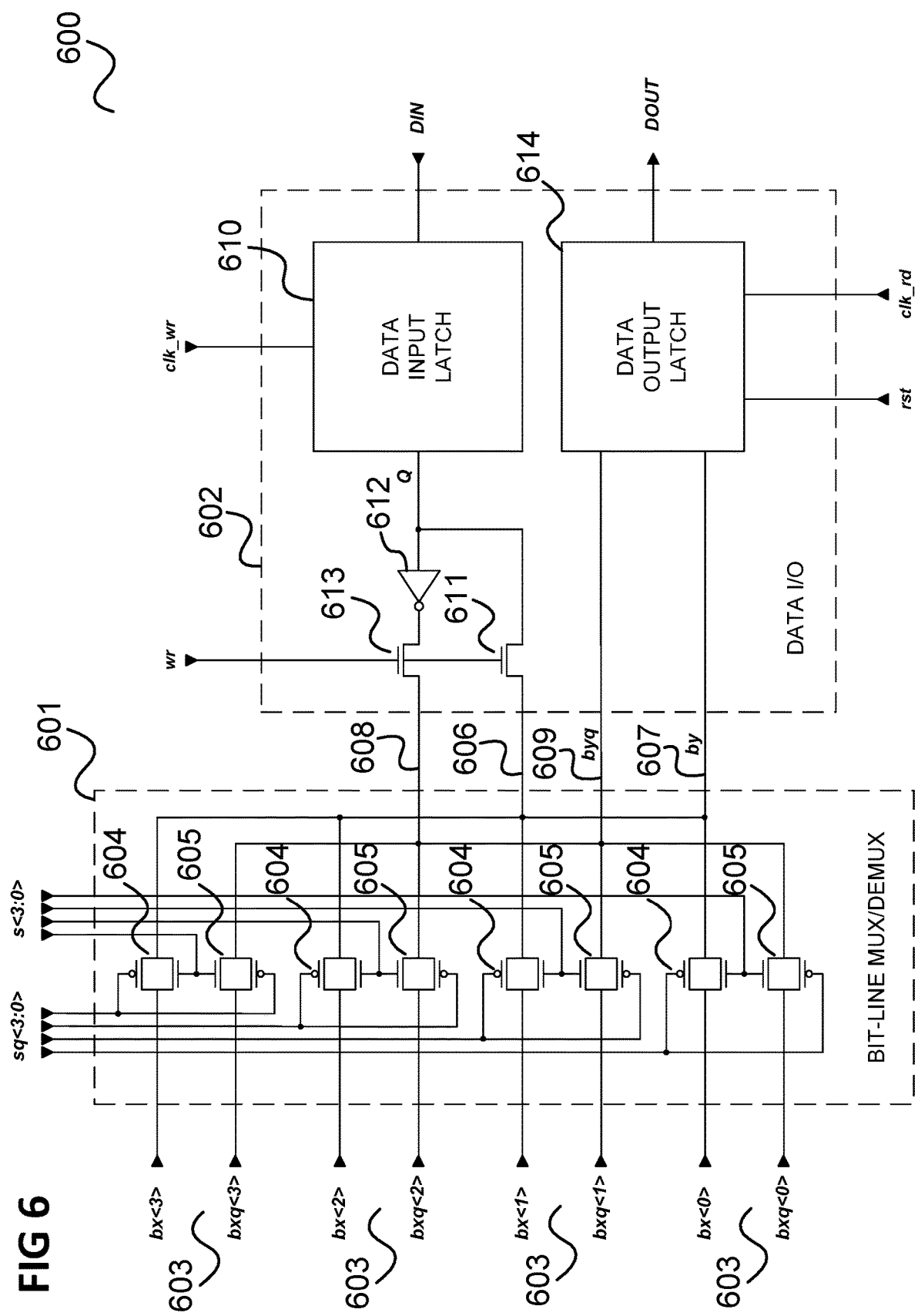
FIG. 6 shows an example for an arrangement of a bit-line multiplexer/demultiplexer connected to an input/output circuit.

FIG. 6 shows an example for an arrangement 600 of a bit-line multiplexer/demultiplexer 601 connected to an input/output circuit 602.

The bit-line multiplexer/demultiplexer 601 for example corresponds to the bit-line multiplexer/demultiplexer 504 and the input/output circuit 602 for example corresponds to the input/output circuit 505.

The bit-line multiplexer/demultiplexer 601 is connected, as described with reference to FIG. 5, to (in this example four) pairs of bit-line terminals 603 (bx<j>, bxq<j>, j=0 . . . 3) and comprises transmission gates 604, 605 wherein for each bit-line terminal 603, a first transmission gate 604 is connected to the first bit-line terminal and a first input 606 and a first output 607 of the multiplexer/demultiplexer 601 and a second transmission gate 605 is connected to the second bit-line terminal and a second input 608 and a second output 609 of the multiplexer/demultiplexer 601.

The first transmission gates 604 receive the first select signals s<j>, j=0 . . . 3, at their n channel FET inputs and the second select signals sq<j>, j=0 . . . 3, at their p channel FET inputs and the second transmission gates 605 receive the first select signals s<j>, j=0 . . . 3, at their n channel FET inputs and the second select signals sq<j>, j=0 . . . 3, at their p channel FET inputs.

The input/output circuit 602 comprises a data input latch 610 which receives data to be written to the SRAM via a data input DIN and outputs the data to be written in bits in accordance with a write clock signal clk_wr (i.e. enabled by the write clock signal clk_wr) via a first n channel FET 611 to the first input 606 and via an inverter 612 and a second n channel FET 613 to the second input 608. Then channel FETs 611, 613 can be seen to form the output stage of a write buffer enabled with a write enable signal wr supplied to their gates.

The input/output circuit 602 further comprises a data output latch 614 connected to the first output 607 and the second output 609 which outputs data read from the SRAM via an output DOUT in accordance with a read clock signal clk_rd (i.e. enabled by the read clock signal clk_rd).

Figure 7:
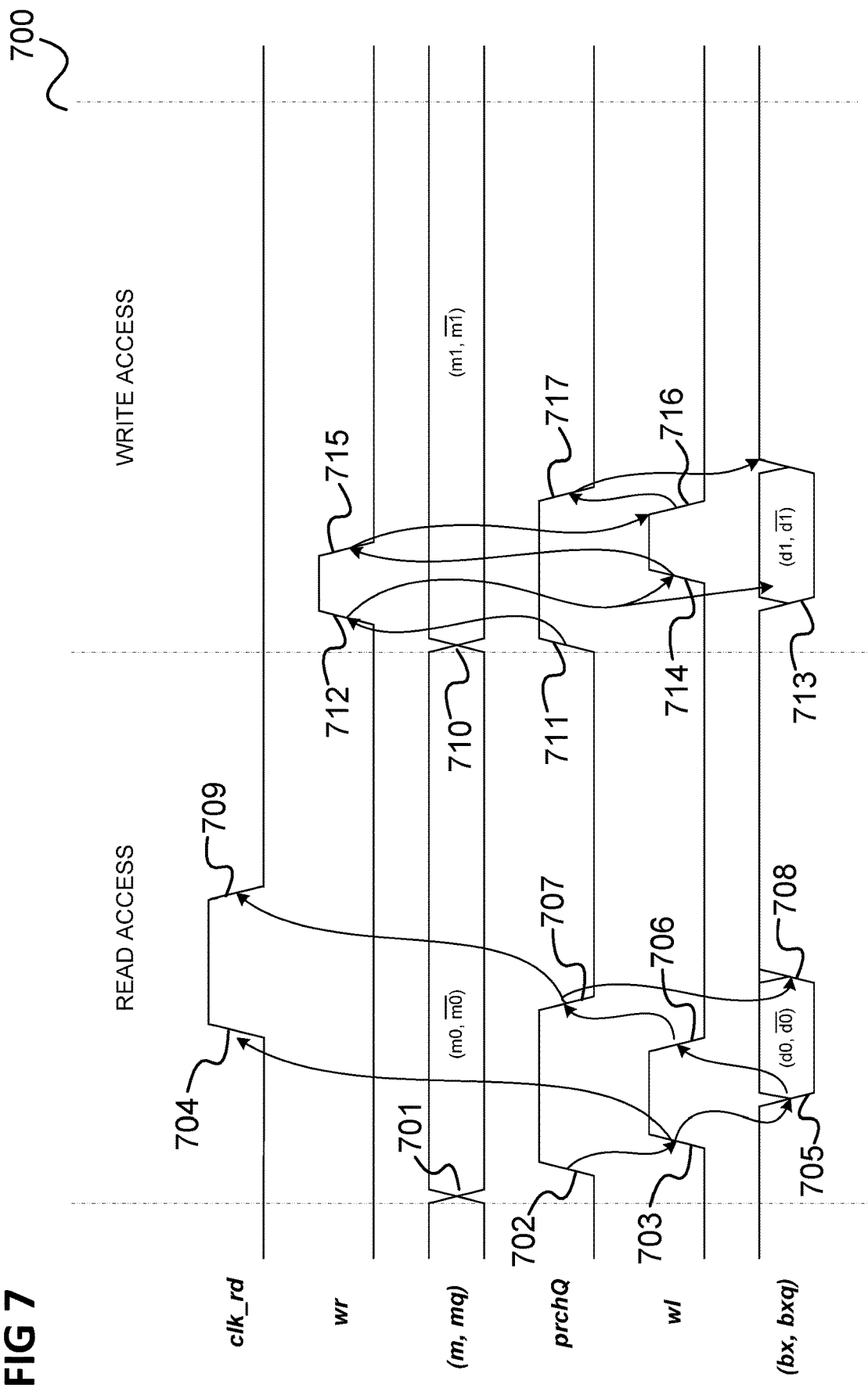
FIG. 7 shows a timing diagram including an example of the behavior of various signals of the embodiments of FIGS. 2 to 6.

FIG. 7 shows a timing diagram 700 including an example of the behavior of various signals of the above examples.

The timing diagram 700 shows, with time flowing from left to right, the behavior of the read clock signal clk_rd, the write enable signal wr, the pair of mask m and its complementary mq, the (low-active) precharge control signal prchQ, the word line signal of an SRAM cell and the pair of states of the bit line terminals bx, bxq.

For a read access, first, the masking bits (m, mq) may change their complementary values at 701, then, at 702, the pre-charge signal prchQ is disabled (i.e. is set to 1), before the word-line as well as the clock clk_rd for the DATA OUTPUT latch are enabled in 703 and 704, whereupon the corresponding SRAM cell is read out so that the bit-line pair (bx, bxq), starting with its precharge value (1, 1) assumes a complementary value (0, 1) or (1, 0) in 705. This in turn is detected by appropriate control circuitry resulting in disabling the word-line in 706, enabling prchQ in 707 to pre-charge the bit-line pairs (bl, blq) and (bx, bxq) to (1, 1) in 708 and deactivating clk_rd in 709.

This ensures a minimal possible critical time interval CTI during which the signals to be protected, i.e. the bit-line pairs, carry sensitive information.

For a write access, first, the masking bits (m, mq) may change their complementary values in 710, and the pre-charge signal prchQ is disabled (i.e. is set to 1) in 711, then the write-enable signal wr is activated (i.e. is set to 1) in 712, whereupon data are written from the data input latch on the bit-lines (bx, bxq) and (bl, blq) and the selected word-line wl (corresponding to the write address applied to the SRAM) can be enabled in 713 and 714 in order to write the data on the bit-lines into the selected bit-cell.

Now, the write signal wr as well as the selected word-line wl are disabled again in 715 and 716, and prchQ is again enabled in 717 to pre-charge the bit-line pairs (bl, blq) and (bx, bxq) to (1, 1) in 718.

This ensures again a minimal possible critical time interval CTI during which the signals to be protected carry sensitive information.

Figure 8:
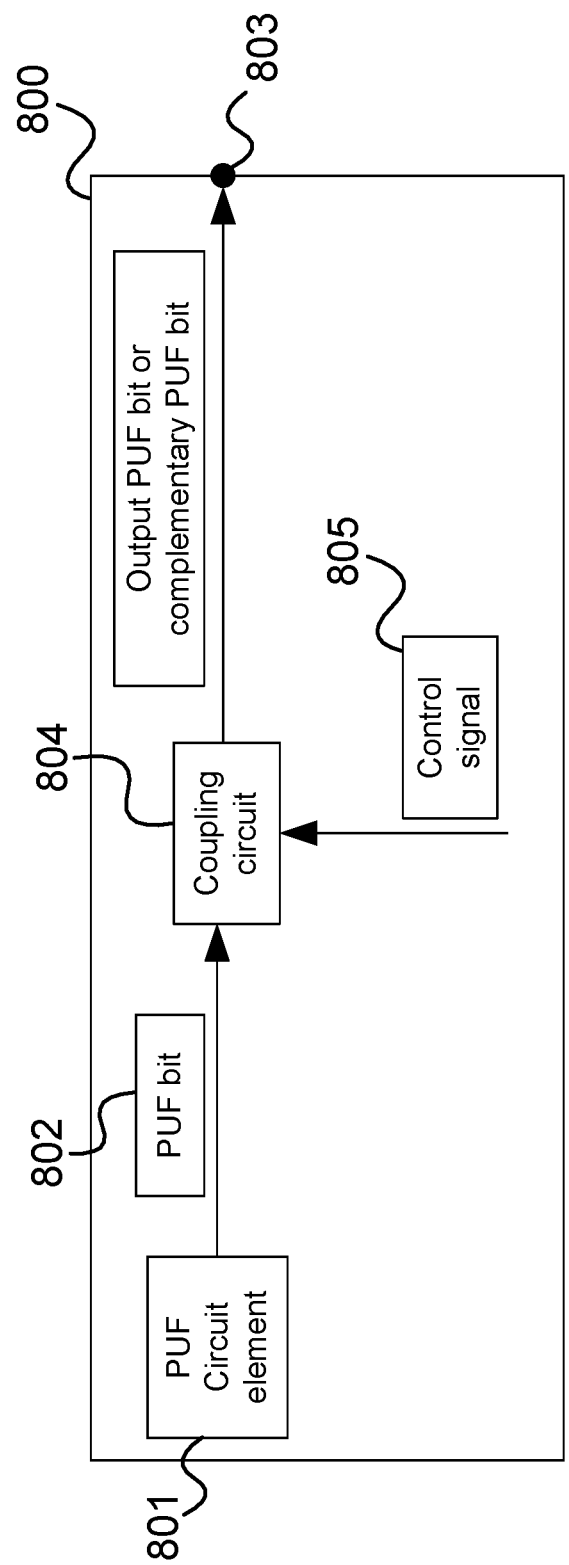
FIG. 8 shows a physical uncloneable function circuit according to an embodiment.

In summary, according to various embodiments, a physical uncloneable function circuit is provided as illustrated in FIG. 8.

FIG. 8 shows a physical uncloneable function circuit 800.

The physical uncloneable function circuit 800 comprises at least one physical uncloneable function circuit element 801 configured to output a bit 802 of a physical uncloneable function value and a physical uncloneable function bit output terminal 803.

The physical uncloneable function circuit 800 further comprises a coupling circuit 804 connected between the physical uncloneable function circuit element 801 and the physical uncloneable function bit output terminal 803. The coupling circuit 804 is configured to receive a control signal 805, to supply the bit (output by the physical uncloneable function circuit element 801) to the physical uncloneable function bit output terminal 803 for a first state of the control signal 805 and to supply the complement of the physical uncloneable function bit (output by the circuit element 801) to the bit output terminal 803 for a second state of the control signal 805.

According to various embodiments, in other words a bit output by a physical uncloneable function (PUF) circuit element (e.g. an SRAM cell or an SRAM-like, e.g. SRAM-based, cell) is masked by outputting it, depending on a control signal, e.g. a masking signal, in original form or in inverted (complementary) form. A receiver of the output bit or its complementary may perform, if applicable, a corresponding de-masking to obtain the bit in its original form (the receiver may for example also be supplied with the control signal). For example, the bit is one bit of a multiplicity of bits used as PUF value, e.g. for generation of a cryptographic key, e.g. an encryption key or an authorization key etc.

The control signal 805 may for example be provided by a control circuit of the circuit 800, e.g. a masking circuit, and may for example comprise a masking bit.

According to various embodiments, the coupling circuit may be arranged as close as possible to the circuit element. The coupling circuit may be directly connected to the circuit element. For example, the circuit may comprise one or more peripheral components, e.g. memory peripherals such as a multiplexer, a demultiplexer, an input or output buffer (e.g. a latch) etc. and the coupling circuit may be connected between the circuit element and the one or more peripherals (in other words before the one or more peripherals). As in the example of FIG. 2, the coupling circuit may for example be arranged before a bus keeper and a precharge circuit or both. In other words, the coupling circuit may be within a border of the PUF circuit. The coupling circuit may even be arranged within the circuit element. In this case, each circuit element (e.g. memory cell) receives the control signal, e.g. via an additional word line as described with reference to FIGS. 3 and 4.

The coupling circuit may be bidirectional. In particular, the coupling circuit may be configured to forward a bit output by one circuit element (of e.g. a multiplicity of circuit elements, e.g. of circuit elements of a bit slice) in one direction (i.e. in direction of the circuit's output) and may be configured to forward a precharge signal in the other direction (i.e. in direction of the circuit element, e.g. to supply a precharge signal to a bit line of the circuit element). The coupling circuit may for example be implemented by transmission gates, e.g. arranged to realize an XOR (exclusive or) combination of the bit output with the control signal.

Since a PUF bit is not known or cannot be predicted and is not stored in the circuit element, it cannot be stored in masked form. Therefore, the PUF circuit element can be seen to store and output a plain text bit.

The control signal may be a common control signal used for a multiplicity of coupling circuits, e.g. for the coupling circuits of different memory cells or bit slices which are all (at a time) provided with the same control signal (e.g. the same logic value, e.g. masking bit). The control signal may vary over time, e.g. based on a random number sequence.

Various Examples are described in the following:

Example 1 is a physical uncloneable function circuit as illustrated in FIG. 8.

Example 2 is the physical uncloneable function circuit according to Example 1, wherein the physical uncloneable function circuit element is configured to output the bit and the complementary of the bit and the coupling circuit is configured to forward the bit to the physical uncloneable function bit output terminal for the first state of the control signal and to forward the complementary of the bit to the physical uncloneable function bit output terminal for the second state of the control signal.

Example 3 is the physical uncloneable function circuit according to Example 2, further comprising a second physical uncloneable function bit output terminal and the coupling circuit is configured to forward the bit to the second physical uncloneable function bit output terminal for the second state of the control signal and to forward the complementary of the bit to the second physical uncloneable function bit output terminal for the first state of the control signal.

Example 4 is the physical uncloneable function circuit according to any one of Examples 1 to 3, comprising a control circuit configured to supply the control signal to the coupling circuit.

Example 5 is the physical uncloneable function circuit according to Example 4, wherein the control circuit comprises a random number generator configured to generate the control signal.

Example 6 is the physical uncloneable function circuit according to Example 5, wherein the bit line is a memory bit line.

Example 7 is the physical uncloneable function circuit according to any one of Examples 1 to 6, wherein the circuit element is configured to output the bit in response to a select signal.

Example 8 is the physical uncloneable function circuit according to Example 7, wherein the circuit element is connected to a word line and the select signal is a word line signal.

Example 9 is the physical uncloneable function circuit according to any one of Examples 1 to 8, wherein the at least one physical uncloneable function circuit element is configured to output the bit to a bit line.

Example 10 is the physical uncloneable function circuit according to any one of Examples 1 to 9, comprising a multiplicity of physical uncloneable function circuit elements for the bit output terminal and a select circuit, wherein the select circuit is configured to cause one of the physical uncloneable function circuit elements to output a bit to the coupling circuit and the coupling circuit is configured to supply the bit to the physical uncloneable function bit output terminal for a first state of the control signal and to supply the complement of the bit to the physical uncloneable function bit output terminal for a second state of the control signal.

Example 11 is the physical uncloneable function circuit according to any one of Examples 1 to 8, comprising a multiplicity of physical uncloneable function circuit elements configured to output a respective bit and for each physical uncloneable function circuit element a respective coupling circuit coupling the circuit element with the physical uncloneable function bit output terminal wherein the coupling circuit is configured to receive a control signal, to supply the bit output by the circuit element to the physical uncloneable function bit output terminal for a first state of the control signal and to supply the complement of the bit output by the circuit element to the physical uncloneable function bit output terminal for a second state of the control signal.

Example 12 is the physical uncloneable function circuit according to any one of Examples 1 to 11, further comprising a key generator configured to generate a cryptographic key based on the bit or the complement of the bit.

Example 13 is the physical uncloneable function circuit according to any one of Examples 1 to 12, wherein the physical uncloneable function circuit element is a memory element.

Example 14 is the physical uncloneable function circuit according to any one of Examples 1 to 13, wherein the circuit element comprises a Static Random Access Memory cell.

Example 15 is the physical uncloneable function circuit according to any one of Examples 1 to 14, Example 16 is the physical uncloneable function circuit according to any one of Examples 1 to 15, comprising an array of physical uncloneable function circuit elements, wherein each physical uncloneable function circuit element is configured to output a bit of a physical uncloneable function value, wherein the array of physical uncloneable function circuit elements comprises a plurality of physical uncloneable function bit output terminals and a plurality of coupling circuits, each coupling circuit being connected to a bit output terminal and each physical uncloneable function circuit element being connected to one of the coupling circuits and wherein each coupling circuit is configured to receive a bit from one of the circuit elements, receive a control signal, supply the bit to one of the physical uncloneable function bit output terminals for a first state of the control signal and supply the complement of the bit to the physical uncloneable function bit output terminal for a second state of the control signal.

Example 17 is the physical uncloneable function circuit of Example 16, wherein each of the plurality of coupling circuits is configured to receive the same control signal.

According to a further embodiment, a circuit is provided comprising a plurality of memory cells wherein each memory cell stores a bit and wherein the circuit further comprises an output circuit configured to output the bit stored by one of the memory cells or the inversion of the bit stored by one of the memory cells in accordance with a masking signal which indicates whether bits should be output in original or complementary version.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A physical uncloneable function circuit comprising:
   at least one physical uncloneable function circuit element configured to output a bit of a physical uncloneable function value;
   a physical uncloneable function bit output terminal;
   a second physical uncloneable function bit output terminal; and
   a coupling circuit connected between the physical uncloneable function circuit element and the physical uncloneable function bit output terminal configured to receive a control signal;
   supply the bit to the physical uncloneable function bit output terminal for a first state of the control signal; and
   supply the complement of the bit to the physical uncloneable function bit output terminal for a second state of the control signal;
   wherein the physical uncloneable function circuit element is configured to output the bit and the complement of the bit and the coupling circuit is configured to forward the bit to the physical uncloneable function bit output terminal for the first state of the control signal and to forward the complement of the bit to the physical uncloneable function bit output terminal for the second state of the control signal; and
   wherein the coupling circuit is configured to forward the bit to the second physical uncloneable function bit output terminal for the second state of the control signal and to forward the complement of the bit to the second physical uncloneable function bit output terminal for the first state of the control signal.

2. The physical uncloneable function circuit according to claim 1, comprising a control circuit configured to supply the control signal to the coupling circuit.

3. The physical uncloneable function circuit according to claim 2, wherein the control circuit comprises a random number generator configured to generate the control signal.

4. The physical uncloneable function circuit according to claim 1, wherein the circuit element is configured to output the bit in response to a select signal.

5. The physical uncloneable function circuit according to claim 4, wherein the circuit element is connected to a word line and the select signal is a word line signal.

6. The physical uncloneable function circuit according to claim 1, wherein the at least one physical uncloneable function circuit element is configured to output the bit to a bit line.

7. The physical uncloneable function circuit according to claim 6, wherein the bit line is a memory bit line.

8. The physical uncloneable function circuit according to claim 1, comprising a multiplicity of physical uncloneable function circuit elements for the bit output terminal and a select circuit, wherein the select circuit is configured to cause one of the physical uncloneable function circuit elements to output a bit to the coupling circuit and the coupling circuit is configured to supply the bit to the physical uncloneable function bit output terminal for a first state of the control signal and to supply the complement of the bit to the physical uncloneable function bit output terminal for a second state of the control signal.

9. The physical uncloneable function circuit according to claim 1, comprising a multiplicity of physical uncloneable function circuit elements configured to output a respective bit and for each physical uncloneable function circuit element a respective coupling circuit coupling the circuit element with the physical uncloneable function bit output terminal wherein the coupling circuit is configured to receive a control signal, to supply the bit output by the circuit element to the physical uncloneable function bit output terminal for a first state of the control signal and to supply the complement of the bit output by the circuit element to the physical uncloneable function bit output terminal for a second state of the control signal.

10. The physical uncloneable function circuit according to claim 1, further comprising a key generator configured to generate a cryptographic key based on the bit or the complement of the bit.

11. The physical uncloneable function circuit according to claim 1, wherein the physical uncloneable function circuit element is a memory element.

12. The physical uncloneable function circuit according to claim 1, wherein the circuit element comprises a Static Random Access Memory cell.

13. The physical uncloneable function circuit according to claim 1, comprising an array of physical uncloneable function circuit elements, wherein each physical uncloneable function circuit element is configured to output a bit of a physical uncloneable function value, wherein the array of physical uncloneable function circuit elements comprises a plurality of physical uncloneable function bit output terminals and a plurality of coupling circuits, each coupling circuit being connected to a bit output terminal and each physical uncloneable function circuit element being connected to one of the coupling circuits and wherein each coupling circuit is configured to receive a bit from one of the circuit elements;

receive a control signal;

supply the bit to one of the physical uncloneable function bit output terminals for a first state of the control signal; and supply the complement of the bit to the physical uncloneable function bit output terminal for a second state of the control signal.

14. The physical uncloneable function circuit of claim 13, wherein each of the plurality of coupling circuits is configured to receive the same control signal.

15. A physical uncloneable function circuit comprising:

an array of physical uncloneable function circuit elements, wherein each physical uncloneable function circuit element is configured to output a bit of a physical uncloneable function value, wherein the array of physical uncloneable function circuit elements comprises a plurality of physical uncloneable function bit output terminals and a plurality of coupling circuits, each coupling circuit being connected to a bit output terminal and each physical uncloneable function circuit element being connected to one of the coupling circuits and wherein each coupling circuit is configured to receive a bit from one of the circuit elements;

receive a control signal;

supply the bit to one of the physical uncloneable function bit output terminals for a first state of the control signal; and supply the complement of the bit to the physical uncloneable function bit output terminal for a second state of the control signal;

wherein each of the plurality of coupling circuits is configured to receive the same control signal.

* * * * *